(12) United States Patent
Lebron et al.

(10) Patent No.: US 11,365,512 B2
(45) Date of Patent: Jun. 21, 2022

(54) TEXTILE PRINTING WITH INKJET INKS

(71) Applicant: HEWLETT-PACKARD DEVELOPMENT COMPANY, L.P., Spring, TX (US)

(72) Inventors: Hector Lebron, San Diego, CA (US); Raffaella Fior, San Diego, CA (US); Stephen G. Rudisill, San Diego, CA (US); Jesiska Tandy, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,794

(22) PCT Filed: Apr. 16, 2018

(86) PCT No.: PCT/US2018/027796
§ 371 (c)(1),
(2) Date: Oct. 24, 2019

(87) PCT Pub. No.: WO2019/203792
PCT Pub. Date: Oct. 4, 2019

(65) Prior Publication Data
US 2021/0047777 A1    Feb. 18, 2021

(51) Int. Cl.
*D06P 5/30* (2006.01)
*C09D 11/322* (2014.01)
(Continued)

(52) U.S. Cl.
CPC ............. *D06P 5/30* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,909,328 A    9/1975 Dessauer et al.
4,589,884 A    5/1986 Gilpatrick
(Continued)

FOREIGN PATENT DOCUMENTS

CN    103450740 B    12/2013
WO    WO2001086054 A1    11/2001
(Continued)

OTHER PUBLICATIONS

Broadbent Arthur D et al. "Continuous Dyeing of Cotton with Reactive Dyes Using Infrared Heat" Apr. 21, 2005 IECRes https://pubs.acs.org/doi/abs/10.1021/ie040288r.
(Continued)

*Primary Examiner* — Manish S Shah
(74) *Attorney, Agent, or Firm* — Dierker & Kavanaugh PC

(57) ABSTRACT

A printing method includes selecting an inkjet ink including a pigment, and selecting an active agent, including an electromagnetic radiation-absorbing active material, and an aqueous or non-aqueous vehicle. The method further includes inkjet printing the inkjet ink and the active agent directly onto a textile fabric. The textile fabric having the ink and active agent thereon is exposed to electromagnetic radiation.

16 Claims, 3 Drawing Sheets

(51) Int. Cl.
*C09D 11/38* (2014.01)
*D06P 1/44* (2006.01)
*D06P 1/52* (2006.01)
*D06P 5/20* (2006.01)
*B41J 2/21* (2006.01)

(52) U.S. Cl.
CPC .......... *C09D 11/322* (2013.01); *C09D 11/38* (2013.01); *D06P 1/445* (2013.01); *D06P 1/5257* (2013.01); *D06P 5/2016* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 4,680,032 | A | 7/1987 | Arnott |
| 2003/0104314 | A1 | 6/2003 | Zheng et al. |
| 2005/0274274 | A1* | 12/2005 | Gore .................. C09B 67/0077 101/491 |
| 2006/0164487 | A1* | 7/2006 | Kadomatsu ........ B41J 11/00214 347/102 |
| 2006/0238592 | A1* | 10/2006 | Kadomatsu ............ B41J 2/2114 347/102 |
| 2007/0109382 | A1* | 5/2007 | Lafleche ................ B41J 11/002 347/102 |
| 2010/0263571 | A1 | 10/2010 | Vonwiller et al. |
| 2013/0201252 | A1* | 8/2013 | Namba ................ B41J 11/0015 347/21 |
| 2013/0307914 | A1* | 11/2013 | Chen ...................... B41J 2/2114 347/100 |
| 2015/0307728 | A1 | 10/2015 | Omenetto et al. |
| 2015/0323879 | A1* | 11/2015 | Kabalnov ............ C09D 11/037 428/207 |
| 2017/0029637 | A1 | 2/2017 | Loccufier et al. |
| 2017/0218565 | A1 | 8/2017 | Loccufier |
| 2021/0040686 | A1* | 2/2021 | Lebron ................ B41M 5/0023 |

FOREIGN PATENT DOCUMENTS

| | | | | |
|---|---|---|---|---|
| WO | WO2015158592 A1 | 10/2015 | | |
| WO | WO-2017047736 A1 * | 3/2017 | ............. C09D 11/38 |
| WO | WO2017047736 A1 | 3/2017 | | |
| WO | WO2017069778 A1 | 4/2017 | | |
| WO | WO2019094006 A1 | 5/2019 | | |
| WO | WO2019094007 A1 | 5/2019 | | |
| WO | WO2019094010 A1 | 5/2019 | | |

OTHER PUBLICATIONS

Paul Debasree et al. "Effect of Temperature on Dyeing Cotton Knitted Fabrics with Reactive Dyes" Dec. 2017 JSAER; ISSN: 2394-2630.

* cited by examiner

TEXTILE PRINTING WITH INKJET INKS

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers are gaining acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Textile printing processes rely on post-printing (post-processing) methods for colorant-to-fabric fixation. Post-processing methods, such as, e.g., calendering, use secondary (non-printing) hardware to apply heat and/or pressure for an amount of time sufficient to drive colorant binding onto textile fibers. These post-processing methods render printed textiles with desired color attributes and durability performance.

In contrast, examples of textile printing methods of the present disclosure do not involve post-processing. Examples of the printing methods disclosed herein include the discrete placement of an active agent (e.g., an infrared (IR) absorbing inkjet fluid) to drive localized heat generation on textile fibers to drive a local colorant fixation. Examples of the printing methods disclosed herein include the ability to adjust the active agent concentration to modulate heat intensity and balance out/compensate for different properties of various colorants. As such, according to example printing methods, textiles are printed and exposed to an energy source (such as, e.g., an IR lamp) within the printing system without additional/secondary post-printing (post-processing) methods.

Figure 1:
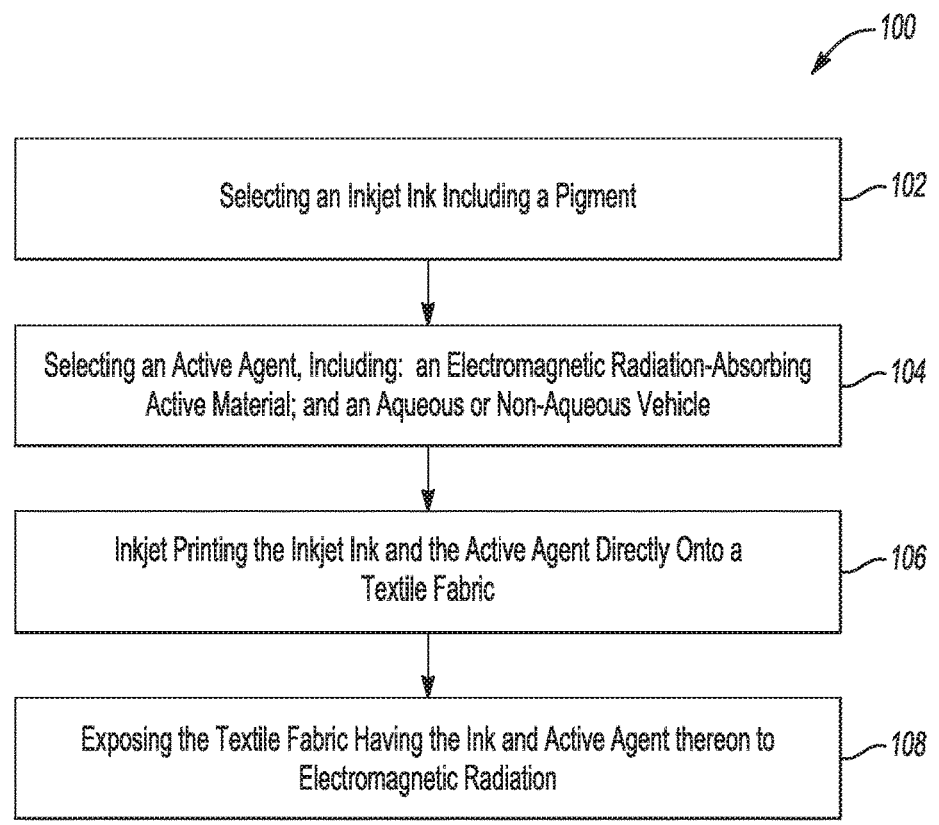
FIG. 1 is a flow diagram illustrating an example of a printing method.

Referring now to FIG. 1, an example of a printing method 100 comprises:

selecting an inkjet ink including a pigment (as shown at reference numeral 102);

selecting an active agent, including: an electromagnetic radiation-absorbing active material; and an aqueous or non-aqueous vehicle (as shown at reference numeral 104);

inkjet printing the inkjet ink and the active agent directly onto a textile fabric (as shown at reference numeral 106); and exposing the textile fabric having the ink and active agent thereon to electromagnetic radiation (as shown at reference numeral 108).

The exposing of the fabric having the fabric and active agent thereon raises the temperature of the fabric to a temperature sufficient to fix/bind the ink to the fabric surface. This renders the printed image durable, wash-resistant, and colorfast.

A liquid fluid set for inkjet printing comprises:

an inkjet ink 24 including a pigment; and an active agent 26, including: an electromagnetic radiation-absorbing active material; and an aqueous or non-aqueous vehicle.

Figure 2:
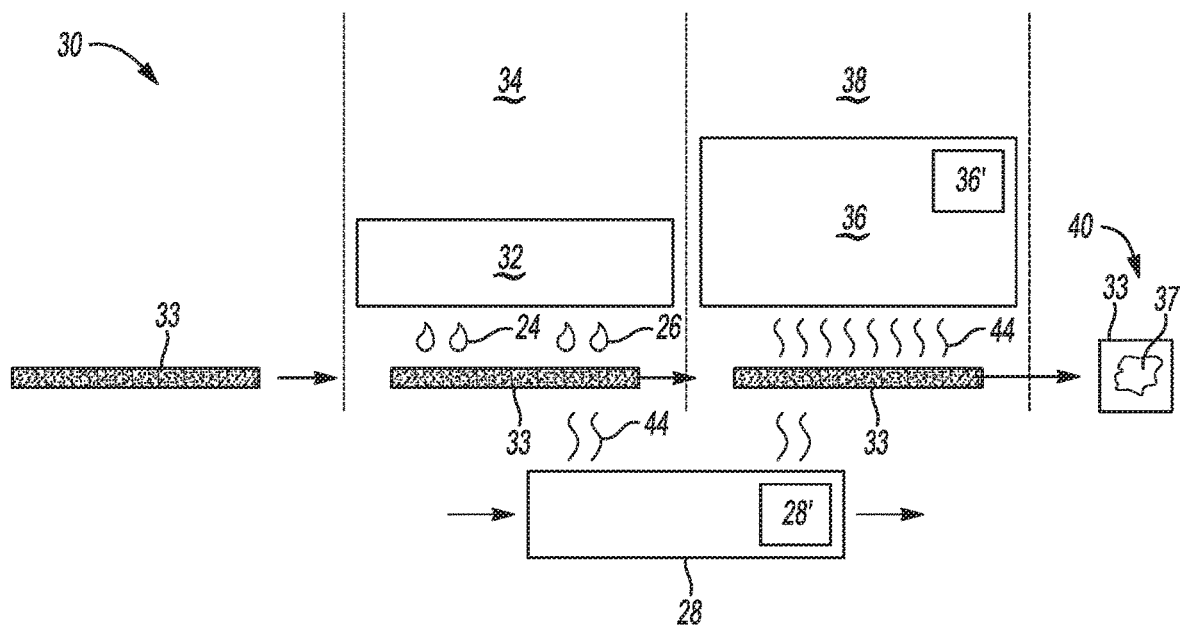
FIG. 2 is a schematic diagram of an example of a printing system.

Referring now to FIG. 2, a schematic diagram of a printing system 30 includes an inkjet printer 32 in a printing zone 34 of the printing system 30 and a source 36 of radiation 44 positioned in a fixation zone 38 of the printing system 30.

In an example, a textile fabric/substrate 33 may be transported through the printing system 30 along the path shown by the arrows in FIG. 2 such that the textile substrate 33 is first fed to the printing zone 34 where an example of a pigmented inkjet ink 24 is inkjet printed directly onto the textile substrate 33 by the inkjet printer 32 (for example, from a piezo- or thermal-inkjet printhead) to form an ink layer on the textile substrate 33. An active agent 26 is also inkjet printed (before, simultaneously with, or after) on or under the ink layer. The textile substrate 33 having the ink layer and active agent disposed thereon may then be transported to the fixation zone 38 where the ink layer/active agent is exposed to electromagnetic radiation 44. In an example, the exposing to electromagnetic radiation provides discrete, localized heating from the active agent to accomplish fixation of the inkjet ink 24 onto the textile fabric 33, to form a printed image 37. The fixation of the ink 24 (causing it to bind onto the textile substrate 33) forms a printed article 40 including the image 37 formed on the textile substrate 33.

In an example of the printing method 100, the printed image 37 is formed without a post-treatment processing. The printed image 37 without the post-treatment is of a desirable color quality and is durable (e.g., washfast/water resistant).

An example of the printing method 100 further comprises maintaining the inkjet ink 24 separate from the active agent 26 until they are inkjet printed.

In some examples, the source 36 of radiation 44 may be positioned to apply radiation 44 to the textile substrate 33 immediately after the ink 24/active agent 26 has been applied thereto. In the example shown in FIG. 2, the source 36 of radiation 44 is disposed in the fixation zone 38, which allows for printing and exposing to radiation 44 in a single pass. In this example, the source 36 may be moved or scanned across the printed image 37 in the fixation zone 38.

In another example, a source 28 of radiation 44 may be in a fixed position with respect to the textile substrate 33. The source 28 in the fixed position may be a conductive heater or a radiative heater that is part of the printing system 30. These types of heaters (sources 28 of radiation 44) may be placed below the textile substrate 33 (e.g., conductive heating from below the substrate 33, such as with, e.g., a conductive platen (source 28 is shown schematically as a platen in FIG. 2) upon which the textile substrate/fabric 33 is transported). These types of heaters (sources 28 of radiation 44) may also or alternatively be placed above the textile substrate 33 (e.g., radiative heating/warming of the textile substrate 33). In another example, the source 28 of radiation 44 may not be in a fixed position (e.g., similar to source 36) with respect to the textile substrate 33; for example, the textile substrate/fabric 33 may move through a warming zone that is heated by the source 28 of radiation 44.

The source 36, 28 of radiation 44 may emit radiation 44 having wavelengths ranging from about 700 nm to about 1 mm. As such, in an example, the electromagnetic radiation to which the textile fabric is exposed has a wavelength ranging from about 700 nm to about 1 mm. In another example, the radiation 44 may range from about 800 nm to about 2 μm. As yet another example, the radiation 44 may be blackbody radiation with a maximum intensity at a wavelength of about 1100 nm. The source 36, 28 of radiation 44 may be infrared (IR) or near-infrared (NIR, near-IR) light sources, such as IR or near-IR curing lamps, IR or near-IR light emitting diodes (LED), lasers with the desirable IR or near-IR electromagnetic wavelengths, or any combination thereof.

The source 36, 28 of radiation 44 may be operatively connected to a lamp/laser driver, an input/output temperature controller, and temperature sensors, which are collectively shown as radiation system components 36', 28'. The respective radiation system components 36', 28' may operate together (i.e., lamp/laser driver, input/output temperature controller, and temperature sensors) to control the respective source 36, 28 of radiation 44. The temperature recipe (e.g., radiation exposure rate) may be submitted to the input/output temperature controller. During heating, the temperature sensors may sense the temperature of the textile fabric 33, and the temperature measurements may be transmitted to the input/output temperature controller. For example, a thermometer associated with the heated area can provide temperature feedback. The input/output temperature controller may adjust the source 36, 28 of radiation 44 power set points based on any difference between the recipe and the real-time measurements. These power set points are sent to the lamp/laser drivers, which transmit appropriate lamp/laser voltages to the source 36, 28 of radiation 44. It is to be understood that this is one example of the radiation system components 36', 28', and that other radiation source control systems may be used. For example, a print system 30 controller (not shown) may be configured to control the source 36, 28 of radiation 44.

An example of the printing method 100 further comprises warming the textile fabric 33 having the ink and the active agent thereon at a temperature below a fixation temperature of the inkjet ink 24: i) before the exposing (to electromagnetic radiation); or ii) concurrently with the exposing; or iii) both before and concurrently with the exposing. It is to be understood that the warming may be accomplished by either or both of the sources 36, 28 of radiation 44.

In an example of the printing method 100, the temperature at which the textile fabric 33 is warmed ranges from about 60° C. to about 100° C. In another example, the temperature at which the textile fabric 33 is warmed ranges from about 70° C. to about 90° C. It is to be understood that this warming temperature range may vary, depending upon, e.g., the fixation temperature of the selected inkjet ink. For example, if the fixation temperature of a selected ink were 160° C., the warming temperature may be any suitable temperature below 160° C.

In an example of the printing method 100, the warming takes place for an amount of time ranging from about 0.1 seconds to about 30 seconds. In another example, the warming takes place for an amount of time ranging from about 3 seconds to about 18 seconds. In yet another example, the warming takes place for an amount of time ranging from about 1 second to about 5 seconds. It is to be understood that this warming time range may vary, depending upon, e.g., the temperature at which warming takes place. For example, if the warming temperature is at a higher end of a range, the time for warming may be at a lower end of a range. It is to be further understood that examples of the method 100 may be accomplished without warming/pre-heating. For example, if the amount of time and the temperature at which the fabric 33 having the ink 24 and active agent 26 thereon is exposed to radiation is enough to fix the ink 24 onto the fabric 33, warming may not be performed.

In still another example of the printing method 100, the active agent 26 is applied directly onto the textile fabric 33 before the inkjet ink 24 is applied, and the method 100 further comprises warming the textile fabric 33 having the active agent 26 thereon at a temperature below a fixation temperature of the inkjet ink 24: i) before the inkjet ink 24 is applied; and ii) before the exposing. In these examples, the active agent 26 may be applied directly onto the textile fabric 33, and then the textile fabric 33 having the active agent 26 thereon may be warmed to a temperature below a fixation temperature of the inkjet ink 24, and then the inkjet ink 24 may be applied, and then the exposure to fix the inkjet ink 24 may be performed. This example may help to improve edge and/or character definition and may also avoid or minimize image blurring.

In an example of the printing method 100, the exposing (to electromagnetic radiation) takes place for an amount of time sufficient to raise a temperature of the textile fabric 33 having the inkjet ink 24 and the active agent 26 thereon to a temperature at which the inkjet ink is fixed. This temperature will depend, in part, upon the textile fabric 33 and the inkjet ink 24 selected. As an example, the exposing (to electromagnetic radiation) takes place for an amount of time sufficient to raise a temperature of the textile fabric 33 having the inkjet ink 24 and the active agent 26 thereon to between about 60° C. and about 200° C. In another example, the exposing takes place for an amount of time sufficient to raise a temperature of the textile fabric 33 having the inkjet ink 24 and the active agent 26 thereon to between about 150° C. and about 190° C. In yet another example, the exposing takes place for an amount of time sufficient to raise a temperature of the textile fabric 33 having the inkjet ink 24 and the active agent 26 thereon to between about 100° C. and about 150° C. It is to be understood that this temperature range (i.e., the temperature range within which the ink 24 will fix onto the fabric 33) for the textile fabric 33 may vary, depending upon, e.g., the fixation temperature of the selected inkjet ink. For example, if the fixation temperature of a selected ink were 150° C., the temperature to which the fabric is raised may be any suitable temperature at or slightly above (e.g., +5° C.) 150° C.

In an example of the printing method 100, the exposing (of the textile fabric 33 having the inkjet ink 24 and the active agent 26 thereon to electromagnetic radiation) is accomplished at an amount of time ranging from about 1 second to about 15 seconds. In another example, the exposing is accomplished at an amount of time ranging from about 2 seconds to about 20 seconds. It is to be understood that the time for exposing to radiation may be the time of a single exposure event, or it may be the cumulative time of multiple short exposing events. It is to be further understood that if multiple short exposing events are used, each of the short exposing events would be accomplished at, or above the fixation temperature of the selected inkjet ink 24.

In an example of the method 100, an amount of the active agent 26 printed onto the textile fabric 33 ranges from about 1% to about 50%, relative to a total volume of the inkjet ink 24 printed onto the textile fabric 33. In another example, an amount of the active agent 26 printed onto the textile fabric 33 ranges from about 10% to about 20%, relative to a total volume of the inkjet ink 24 printed onto the textile fabric 33. In yet another example, an amount of the active agent 26 printed onto the textile fabric 33 ranges from about 5% to about 45%; or from about 10% to about 30%, relative to a total volume of the inkjet ink 24 printed onto the textile fabric 33. It is to be understood that by "relative to a total volume of the inkjet ink" is meant that, for example, if the desired active agent 26 volume were 10%, and the total volume of the inkjet ink 24 were 100 picoliters, the amount of active agent 26 printed on the fabric 33 would be 10 picoliters (along with the 100 picoliters of inkjet ink 24). Further, it is to be understood that the amount of active agent 26 to be printed on the textile fabric 33 depends upon how much colorant/ink 24 is to be fixed and for how long the exposure (to radiation) takes place. For example, if the exposing takes place for a longer amount of time, less active agent 26 may be applied; or if the exposing takes place for a shorter amount of time, more active agent 26 may be applied. In another example, if a smaller amount of colorant is to be fixed, less active agent 26 may be applied; or if a larger amount of colorant is to be fixed, more active agent 26 may be applied. Further, it is to be understood that the amount of active agent 26 to be printed may also depend upon if a warming event (as described above) is included, and if so, for how long and at what warming temperature.

Active Agents

In the examples of the method 100 and the system 30 disclosed herein, and as mentioned above, an active agent 26 may be used. Some examples of the active agent 26 are dispersions including a radiation absorber (i.e., an active material). In an example, the electromagnetic radiation-absorbing active material is selected from the group consisting of an infrared light absorber, a near-infrared light absorber, a plasmonic resonance absorber, and combinations thereof.

In an example, the electromagnetic radiation-absorbing active material comprises the plasmonic resonance absorber. In an example, the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

In some examples, the active material may be any infrared light absorbing colorant. In an example, the active material is a near-infrared light absorber. Any near-infrared colorants, e.g., those produced by Fabricolor, Eastman Kodak, BASF, or Yamamoto, may be used in the active agent 26.

Other suitable active materials include near-infrared absorbing dyes or plasmonic resonance absorbers.

Some suitable examples of active agent 26 include Lumogen® IR 765 and Lumogen® IR 788, commercially available from BASF. The Lumogen® dyes are quaterrylene dyes, which are based on the following chemical backbone:

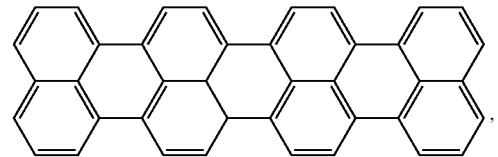 [SMILES: C1=CC2c3ccc4c5cccc6cccc(c7ccc(c3c74)C3=CC=c4c(c1c1cccc7cccc4c71)C32)c65]

which may have pendant groups attached on the ends, and in some instances along the backbone chain.

As another example, the active agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

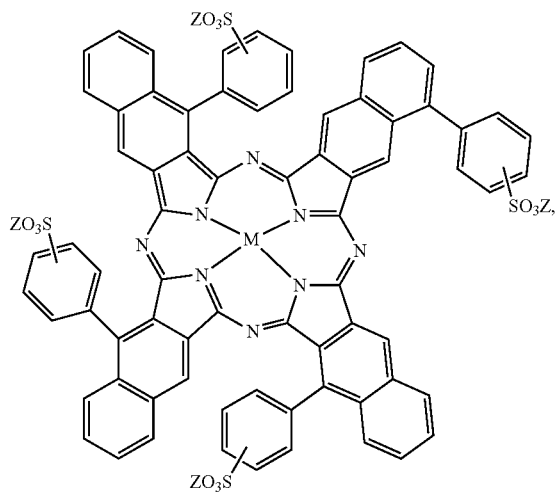

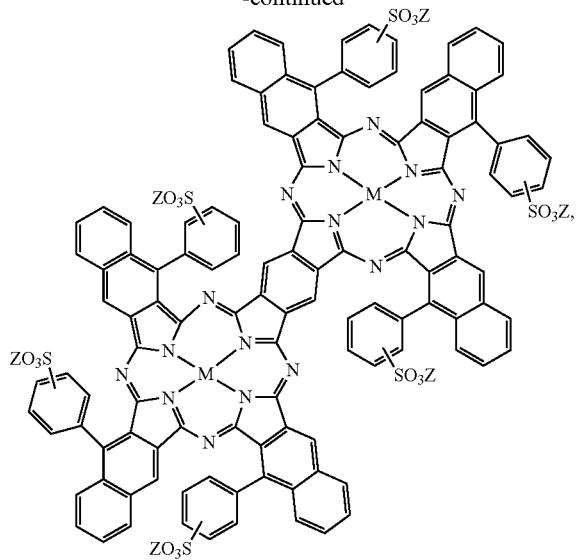

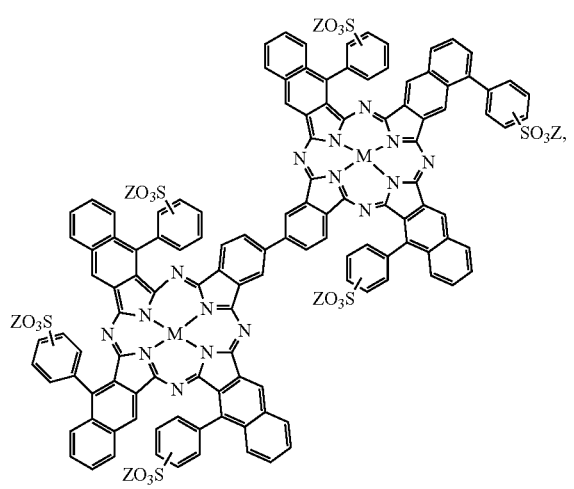

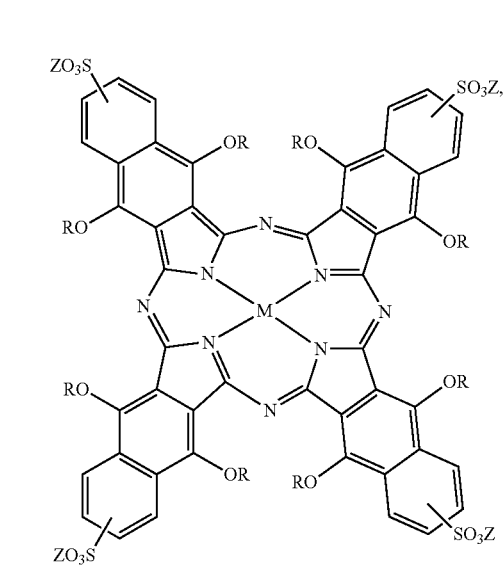

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

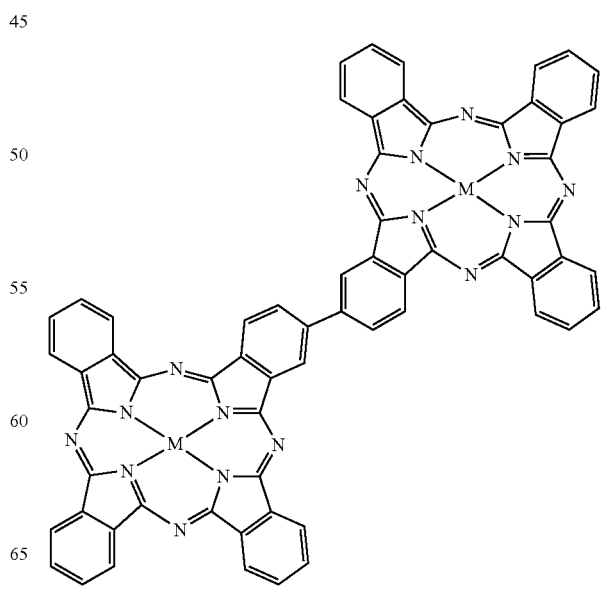

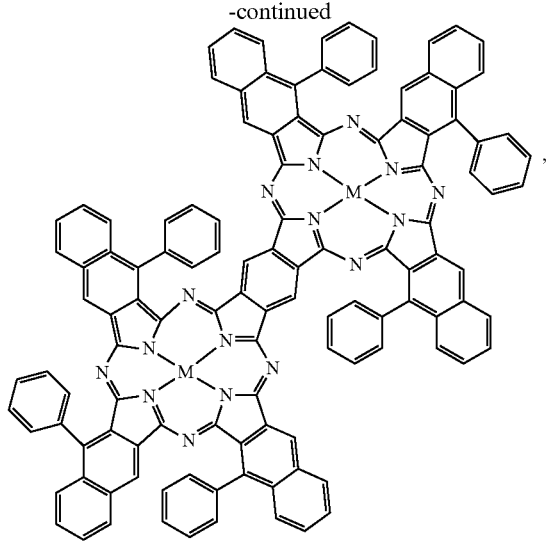

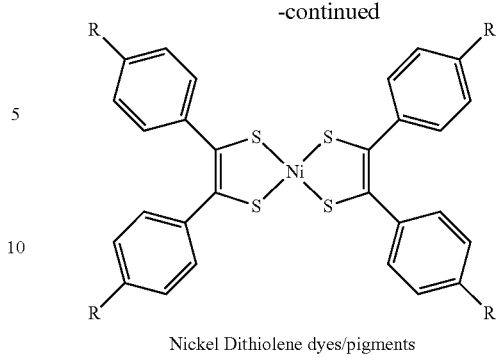

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

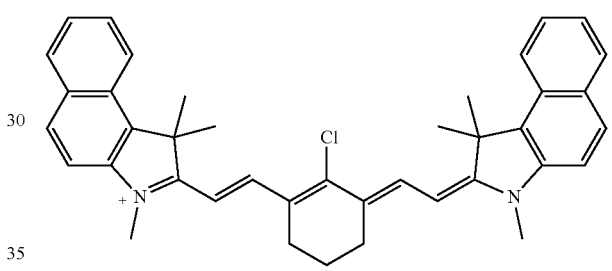

Cyanine dyes/pigments

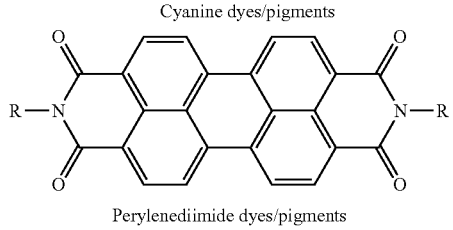

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

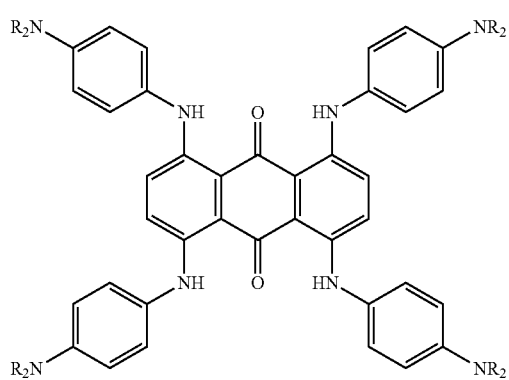

Anthroquinone dyes/pigments

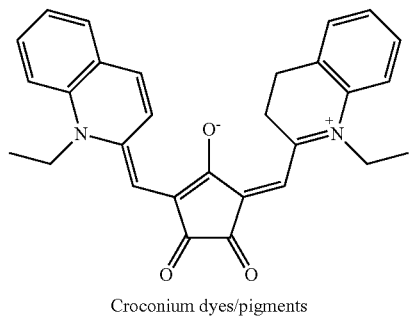

Croconium dyes/pigments

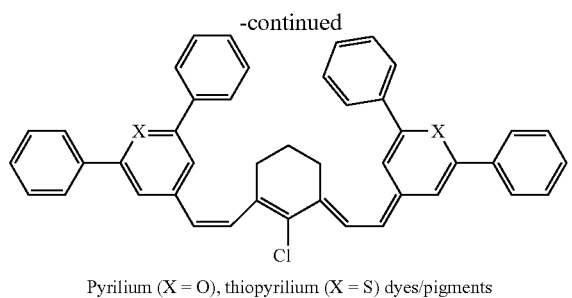

Pyrilium (X = O), thiopyrilium (X = S) dyes/pigments

Boron-dipyrromethene dyes or pigments and aza-boron-dipyrromethene dyes or pigments may have the following structures, respectively:

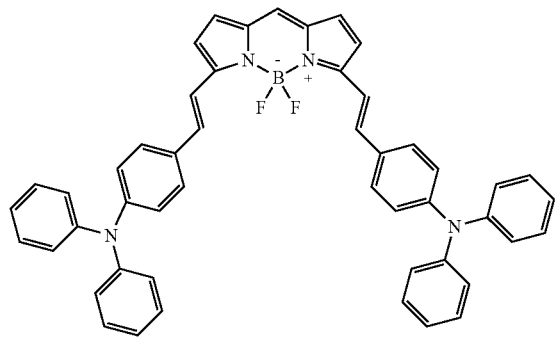

boron-dipyrromethene dyes/pigments

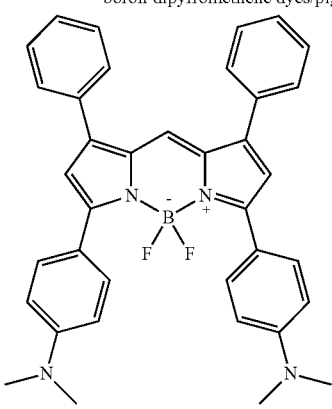

aza-boron-dipyrromethene dyes/pigments

In other examples, the active material may be a plasmonic resonance absorber. The plasmonic resonance absorber allows the active agent 26 to absorb radiation at wavelengths ranging from 800 nm to 4000 nm (e.g., at least 80% of radiation having wavelengths ranging from 800 nm to 4000 nm is absorbed), which enables the active agent 26 to convert enough radiation to thermal energy so that the inkjet ink 24 is fixed on the textile fabric 33. The plasmonic resonance absorber also allows the active agent 26 to have transparency at wavelengths ranging from 400 nm to 780 nm (e.g., 20% or less of radiation having wavelengths ranging from 400 nm to 780 nm is absorbed), which enables the printed article 40 to be lightly colored without the active agent 26 deleteriously affecting the color of the printed article 40.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the active agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

Example Active Agents a. Dispersion

Examples of the active agents 26 include a dispersion comprising a metal oxide nanoparticle having the formula (1) $M_mM'O_n$ wherein M is an alkali metal, m is greater than 0 and less than 1, M' is any metal, and n is greater than 0 and less than or equal to 4; a zwitterionic stabilizer; and a balance of water.

As used in this example, the term "dispersion" refers to a two-phase system where one phase consists of finely divided metal oxide particle distributed throughout a bulk substance, i.e., a liquid active agent vehicle. The metal oxide nanoparticle is the dispersed or internal phase, and the bulk substance is the continuous or external phase (liquid vehicle). As disclosed in this example, the liquid medium is an aqueous liquid medium, i.e., comprising water.

In some examples, the metal oxide nanoparticles may be present in the dispersion in an amount ranging from about 1 wt % to about 20 wt % based on the total weight of the dispersion. In some other example, the zwitterionic stabilizer may be present in the dispersion in an amount ranging from about 2 wt % to about 35 wt % (based on the total weight of the dispersion). In yet some other examples, the weight ratio of the metal oxide nanoparticles to the zwitterionic stabilizer ranges from 1:10 to 10:1. In another example, the weight ratio of the metal oxide nanoparticles to the zwitterionic stabilizer is 1:1.

b. Nanoparticles

In some examples, described herein is a nanoparticle metal oxide having formula (1): $M_mM'O_n$, wherein M is an alkali metal, m is greater than 0 and less than 1, M' is any metal, and n is greater than 0 and less than or equal to 4.

As per formula (1), M is an alkali metal, and can be lithium (Li), sodium (Na), potassium (K), rubidium (Rb), cesium (Cs), or mixtures thereof. Indeed, without being bound by any theory, it is believed that such compound possesses a satisfactory absorption of NIR light (having a wavelength between about 750 nm and about 1400 nm) while retaining a high transmittance of visible light (having a wavelength between about 380 nm to about 750 nm).

In some examples, the nanoparticles of the present example absorb infrared light in a range of from about 750 nm to about 2300 nm. In some other examples, the nanoparticles of the present example absorb infrared light in a range of from about 780 nm to about 1400 nm. In yet some other examples, the nanoparticles of the present example absorb infrared light in a range of from about 780 nm to about 2300 nm. The metal oxide nanoparticles can also absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm. The metal oxide can be an IR absorbing inorganic nanoparticle.

The metal oxide nanoparticles of the present example have the formula (1) $M_mM'O_n$. In the formula (1), M is an alkali metal. In some examples, M is lithium (Li), sodium (Na), potassium (K), rubidium (Rb), cesium (Cs), or mixtures thereof. In some other examples, M is cesium (Cs). In the formula (1), M' is any metal. In some examples, M' is tungsten (W), molybdenum (Mb), tantalum (Ta), hafnium (Hf), cerium (Ce), lanthanum (La), or mixtures thereof. In some other examples, M' is tungsten (W). In the formula (1), m is greater than 0 and less than 1. In some examples, m can be 0.33. In the formula (1), n is greater than 0 and less than or equal to 4. In some examples, n can be greater than 0 and less than or equal to 3. In some examples, the nanoparticles of the present disclosure have the formula (1) $M_mM'O_n$, wherein M' is tungsten (W), n is 3 and M is lithium (Li), sodium (Na), potassium (K), rubidium (Rb), cesium (Cs), or mixtures thereof. The nanoparticles are thus Tungsten Bronze nanoparticles having the formula $M_mWO_3$.

In some other examples, the metal oxide nanoparticles are Cesium Tungsten nanoparticles having the formula (1) $M_mM'O_n$, wherein M is cesium (Cs), m is 0.33, M' is tungsten (W), and n is greater than 0 and less than or equal to 3. In an example, the metal oxide nanoparticle is a cesium tungsten oxide nanoparticles having a general formula of $Cs_xWO_3$, where $0<x<1$. The cesium tungsten oxide nanoparticles may give the dispersion a light blue color. The strength of the color may depend, at least in part, on the amount of the cesium tungsten oxide nanoparticles in the dispersion.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm. In a more specific example, the average particle size (e.g., volume-weighted mean diameter (MV)) of the metal oxide nanoparticles may range from about 1 nm to about 40 nm. In some examples, the average particle size of the metal oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

c. Zwitterionic Stabilizer

The dispersion of the present example, comprising metal oxide nanoparticles, also includes the zwitterionic stabilizer. The zwitterionic stabilizer may improve the stabilization of the dispersion. The zwitterionic stabilizer may enhance the stability of the cesium tungsten oxide nanoparticle dispersion during shipment and storage. While the zwitterionic stabilizer has an overall neutral charge, at least one area of the molecule has a positive charge (e.g., amino groups) and at least one other area of the molecule has a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. Then, the negative charge of the negative area of the zwitterionic stabilizer molecules may repel metal oxide nanoparticles from each other. The zwitterionic stabilizer molecules may form a protective layer around the metal oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the metal oxide nanoparticles from agglomerating and/or settling in the dispersion.

Examples of suitable zwitterionic stabilizers include $C_2$ to $C_8$ betaines, $C_2$ to $C_8$ amino-carboxylic acids having a solubility of at least 10 g in 100 g of water, taurine, and combinations thereof. Examples of the $C_2$ to $C_8$ amino-carboxylic acids include beta-alanine, gamma-aminobutyric acid, glycine, and combinations thereof.

The zwitterionic stabilizer may be present in the dispersion in an amount ranging from about 2 wt % to about 35 wt % (based on the total weight of the dispersion). When the zwitterionic stabilizer is the $C_2$ to $C_8$ betaine, the $C_2$ to $C_8$ betaine may be present in an amount ranging from about 8 wt % to about 35 wt % of a total weight of the dispersion. When the zwitterionic stabilizer is the $C_2$ to $C_8$ amino-carboxylic acid, the $C_2$ to $C_8$ amino-carboxylic acid may be present in an amount ranging from about 2 wt % to about 20 wt % of a total weight of the dispersion. When the zwitterionic stabilizer is taurine, taurine may be present in an amount ranging from about 2 wt % to about 35 wt % of a total weight of the dispersion. The zwitterionic stabilizer may be added to the metal oxide nanoparticles and water before, during, or after milling of the nanoparticles in the water to form the dispersion.

Active Material Loading and Active Agent Vehicle

The amount of the active material that is present in the active agent 26 ranges from greater than 0 wt % to about 40 wt % based on the total weight of the active agent 26. In other examples, the amount of the active material in the active agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the active agent 26 having jetting reliability and heat and/or radiation absorbance efficiency.

As used herein, "AA vehicle" (active agent vehicle) may refer to the liquid in which the active material is dispersed or dissolved to form the active agent 26. A wide variety of AA vehicles, including aqueous and non-aqueous vehicles, may be used in the active agent 26. In some examples, the AA vehicle may include water alone or a non-aqueous solvent alone with no other components. In other examples, the AA vehicle may include other components, depending, in part, upon the inkjet printhead that is to be used to dispense the active agent 26. Examples of other suitable active agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the active agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the active agent 26 may range from about 10 wt % to about 200 wt % based on the weight of the plasmonic resonance absorber in the active agent 26.

When the active material is the plasmonic resonance absorber, a silane coupling agent may also be added to the active agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the active agent 26 may range from about 0.1 wt % to about 50 wt % based on the weight of the plasmonic resonance absorber in the active agent 26. In an example, the total amount of silane coupling agent(s) in the active agent 26 ranges from about 1 wt % to about 30 wt % based on the weight of the plasmonic resonance absorber. In another example, the total amount of silane coupling agent(s) in the active agent 26 ranges from about 2.5 wt % to about 25 wt % based on the weight of the plasmonic resonance absorber.

The solvent of the active agent 26 may be water or a non-aqueous solvent (e.g., ethanol, acetone, n-methyl pyrrolidone, aliphatic hydrocarbons, etc.). In some examples, the active agent 26 consists of the active material and the solvent (without other components). In these examples, the solvent makes up the balance of the active agent 26.

Classes of organic co-solvents that may be used in a water-based active agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (also known as 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the active agent 26 in a total amount ranging from about 1 wt % to about 50 wt % based upon the total weight of the active agent 26, depending upon the jetting architecture of the inkjet printhead. In an example, the total amount of the co-solvent(s) present in the active agent 26 is 25 wt % based on the total weight of the active agent 26.

The co-solvent(s) of the active agent 26 may depend, in part, upon the jetting technology that is to be used to dispense the active agent 26. For example, if thermal inkjet printheads are to be used, water and/or ethanol and/or other longer chain alcohols (e.g., pentanol) may be the solvent (i.e., makes up 35 wt % or more of the active agent 26) or co-solvents. For another example, if piezoelectric inkjet printheads are to be used, water may make up from about 25 wt % to about 30 wt % of the active agent 26, and the solvent (i.e., 35 wt % or more of the active agent 26) may be ethanol, isopropanol, acetone, etc. The co-solvent(s) of the active agent 26 may also depend, in part, upon the textile fabric/substrate 33 that is being used with the active agent 26. For a hydrophobic substrate 33 (e.g., a polyamide), the AA vehicle may include a higher solvent content in order to improve the flow of the active agent 26 into the fabric 33.

The AA vehicle may also include humectant(s). In an example, the total amount of the humectant(s) present in the active agent 26 ranges from about 3 wt % to about 10 wt %, based on the total weight of the active agent 26. An example of a suitable humectant is LIPONIC® EG-1 (also known as LEG-1, glycereth-26, and ethoxylated glycerol, available from Lipo Chemicals).

In some examples, the AA vehicle includes surfactant(s) to improve the jettability of the active agent 26. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik). In some examples, it may be desirable to utilize a surfactant having a hydrophilic-lipophilic balance (HLB) less than 10.

Whether a single surfactant is used or a combination of surfactants is used, the total amount of surfactant(s) in the active agent 26 may range from about 0.01 wt % to about 10 wt % based on the total weight of the active agent 26. In an example, the total amount of surfactant(s) in the active agent 26 may be about 3 wt % based on the total weight of the active agent 26.

An anti-kogation agent may be included in the active agent 26 that is to be jetted when using thermal inkjet printing. Kogation refers to the deposit of dried printing liquid (e.g., active agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the active agent 26 may range from greater than 0.20 wt % to about 0.65 wt % based on the total weight of the active agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The AA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the active agent 26 may include a total amount of antimicrobial agents that ranges from about 0.05 wt % to about 1 wt %. In an example, the antimicrobial agent(s) is/are a biocide(s) and is/are present in the active agent 26 in an amount of about 0.25 wt % (based on the total weight of the active agent 26).

Chelating agents (or sequestering agents) may be included in the AA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the active agent 26 may range from greater than 0 wt % to about 2 wt % based on the total weight of the active agent 26. In an example, the chelating agent(s) is/are present in the active agent 26 in an amount of about 0.04 wt % (based on the total weight of the active agent 26).

Textile Fabrics

In an example of printing method 100 (and for use in the system 30), the textile fabric 33 is selected from the group consisting of organic textile fabrics, inorganic textile fabrics, and combinations thereof. Some types of fabrics that can be used include various fabrics of natural and/or synthetic fibers. In an example, the textile fabric is selected from the group consisting of polyester fabrics, polyester blend fabrics, cotton fabrics, cotton blend fabrics, nylon fabrics, nylon blend fabrics, and combinations thereof. It is to be understood that the polyester fabrics may be a polyester coated surface. The polyester blend fabrics may be blends of polyester and other materials (e.g., cotton, linen, etc., as long as polyester is present in an amount of at least 50 wt % and is present at or near the surface of the fabric). In one example, the polyester blend includes from about 70 wt % to about 80 wt % of the polyester. In another example, the textile fabric 33 may be selected from nylons (polyamides) or other synthetic fabrics.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the textile fabric/substrate can include polymeric fibers such as nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours and Company, Delaware), fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

Pigmented Inkjet Inks

Any suitable pigmented inkjet ink may be used in the examples disclosed herein. The inkjet formulation may include a pigment, a dispersant and/or a binder resin, a vehicle, and a balance of water. Several example inkjet inks are provided herein. In some examples, the pigmented inkjet inks disclosed herein do not include a capsule having a core-shell structure, where the core contains a thermally curable compound and the shell contains a polymer. These types of core-shell structures can form a polymeric resin or crosslinked network when thermally activated, and are not included in the examples disclosed herein.

First Example Inkjet Ink

In an example, the inkjet ink is a thermal inkjet ink including a pigment, a single dispersant and binder resin, a vehicle, and a balance of water. In some examples, the thermal inkjet ink consists of the pigment, the single dispersant and binder resin, the vehicle, and a balance of water, with no other components.

In an example, the pigment is present in the thermal inkjet ink in an amount ranging from about 0.5 wt % to about 6 wt % of the total weight of the thermal inkjet ink. In another example, the pigment is present in the thermal inkjet ink in an amount ranging from about 1 wt % to about 6 wt % of the total weight of the thermal inkjet ink.

As used herein, "pigment" may generally include organic and/or inorganic pigment colorants that introduce color to the thermal inkjet ink. Any of a number of pigments of any of a number of primary or secondary colors, or black or white, for example, may be used. As specific examples, the pigment may be any color, including, as examples, a cyan pigment, a magenta pigment, a yellow pigment, a black pigment, a violet pigment, a green pigment, a brown pigment, an orange pigment, a purple pigment, a white pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50. Any quinacridone pigment or a co-crystal of quinacridone pigments may be used for magenta inks.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No.

40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, BLACK PEARLS® series, the MOGUL® series, or the MONARCH® series manufactured by Cabot Corporation, Boston, Mass., (such as, e.g., REGAL® 400R, REGAL® 330R, REGAL® 660R, BLACK PEARLS® 700, BLACK PEARLS® 800, BLACK PEARLS® 880, BLACK PEARLS® 1100, BLACK PEARLS® 4350, BLACK PEARLS® 4750, MOGUL® E, MOGUL® L, and ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

The average particle size of the pigments may range anywhere from about 20 nm to about 200 nm. In an example, the average particle size ranges from about 80 nm to about 150 nm.

In this example, the pigment is dispersed with the single dispersant and binder resin. By "single dispersant and binder resin," it is meant that another dispersant and/or binder is not present in the ink formulation with the styrene acrylic resin(s) defined herein. Rather the styrene acrylic resin(s) alone provide the dispersing function and the binding function.

As a dispersant, the styrene acrylic resin(s) disclosed herein is not chemically attached (e.g., crosslinked) to the pigment. Rather, in some examples, the single dispersant and binder is physically absorbed to at least some of the pigment.

As a binder, the single dispersant and binder resin helps to bind the pigment particles together after printing. It has been found that the single dispersant and binder resin provides washfastness to prints created on cotton fabric from the thermal inkjet ink.

In an example, the single dispersant and binder resin is present in the thermal inkjet ink in an amount ranging from about 0.1 wt % to about 6 wt % of the total weight of the thermal inkjet ink. In another example, the single dispersant and binder resin is present in the thermal inkjet ink in an amount ranging from about 1 wt % to about 6 wt % of the total weight of the thermal inkjet ink.

The single dispersant and binder resin is a styrene acrylic resin having an acid number greater than 100 mg KOH/g and a weight average molecular weight less than 50,000. As used herein, the term "acid number" refers to the mass of potassium hydroxide (KOH) in milligrams that is used to neutralize one gram of the styrene acrylic resin. It is to be understood that multiple styrene acrylic resins (having an acid number greater than 100 mg KOH/g and a weight average molecular weight less than 50,000) may make up the single dispersant and binder resin. In an example of the method 100, the styrene acrylic resin has an acid number ranging from about 120 mg KOH/g to about 300 mg KOH/g. In another example of the method 100, the styrene acrylic resin has a weight average molecular weight ranging from about 3,000 to about 30,000. In still another example of the method 100, the styrene acrylic resin has an acid number ranging from about 120 mg KOH/g to about 300 mg KOH/g and a weight average molecular weight ranging from about 3,000 to about 30,000.

Examples of the single dispersant and binder resin include styrene acrylic resins available from BASF Corp., such as JONCRYL® 683 (acid number of about 165 mg KOH/g and weight average molecular weight of about 8,000), JONCRYL® 671 (acid number of about 214 mg KOH/g and weight average molecular weight of about 16,500), JONCRYL® 678 (acid number of about 215 mg KOH/g and weight average molecular weight of about 8,600), and JONCRYL® 296 (acid number of about 141 mg KOH/g and weight average molecular weight of about 11,500).

In an example, the pigment is present in an amount ranging from about 0.5 wt % to about 6 wt % of a total weight of the thermal inkjet ink; and the single dispersant and binder resin is present in an amount ranging from about 0.1 wt % to about 6 wt % of the total weight of the thermal inkjet ink. In another example, a weight ratio of the pigment to the single dispersant and binder resin is about 1:1.

In an example, the pigment, the single dispersant and binder resin, and water make up a pigment dispersion. In an example, the pigment dispersion includes or consists of the pigment, the single dispersant and binder resin, and water. In another example, the pigment dispersion may also include, for example, a water soluble or water miscible co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. In still another example, the pigment dispersion consists of the pigment, the single dispersant and binder resin, a co-solvent, and water. The pigment dispersion may be prepared or purchased.

The other components of the thermal inkjet ink (i.e., vehicle components) may be slowly mixed with the pigment dispersion to form the thermal inkjet ink.

As used herein, the term "vehicle" may refer to the liquid fluid with which the pigment or pigment dispersion is mixed to form the thermal inkjet ink(s). A wide variety of vehicles may be used with the thermal inkjet ink(s) of the present disclosure. The vehicle may include a co-solvent, an anti-kogation agent, an anti-decel agent, a surfactant, a biocide, a pH adjuster, or combinations thereof. In an example, the vehicle consists of the co-solvent, the anti-kogation agent, the anti-decel agent, the surfactant, the biocide, a pH adjuster, or a combination thereof. In another example, the vehicle consists of water and the co-solvent, the anti-kogation agent, the anti-decel agent, the surfactant, the biocide, a pH adjuster, or a combination thereof. In still another example, the vehicle consists of the anti-kogation agent, the anti-decel agent, the surfactant, the biocide, a pH adjuster, and water.

The vehicle may include co-solvent(s). The co-solvent(s) may be present in an amount ranging from about 2 wt % to about 20 wt % (based on the total weight of the thermal inkjet ink). In an example, the vehicle includes glycerol. Other examples of co-solvents include alcohols, aliphatic alcohols, aromatic alcohols, diols, caprolactams, formamides, acetamides, and long chain alcohols. Examples of such compounds include primary aliphatic alcohols, secondary aliphatic alcohols, 1,2-alcohols, 1,3-alcohols, 1,5-alcohols, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol.

The co-solvent may also be a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol. Examples of polyhydric alcohol derivatives may include an ethylene oxide adduct of diglycerin.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, and triethanolamine.

An anti-kogation agent may also be included in the vehicle. Kogation refers to the deposit of dried ink on a heating element of a thermal inkjet printhead. Anti-kogation agent(s) is/are included to assist in preventing the buildup of kogation. In some examples, the anti-kogation agent may improve the jettability of the thermal inkjet ink. The anti-kogation agent may be present in the thermal inkjet ink in an amount ranging from about 0.1 wt % to about 1.5 wt %, based on the total weight of the thermal inkjet ink. In an example, the anti-kogation agent is present in the thermal inkjet ink in an amount of about 0.5 wt %, based on the total weight of the thermal inkjet ink.

Examples of suitable anti-kogation agents include oleth-3-phosphate (commercially available as CRODAFOS™ O3A or CRODAFOS™ N-3A) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

The vehicle may include anti-decel agent(s). Decel refers to a decrease in drop velocity over time with continuous firing. Anti-decel agent(s) is/are included to assist in preventing decel. In some examples, the anti-decel agent may improve the jettability of the thermal inkjet ink. The anti-decel agent may be present in an amount ranging from about 0.2 wt % to about 5 wt % (based on the total weight of the thermal inkjet ink). In an example, the anti-decel agent is present in the thermal inkjet ink in an amount of about 1 wt %, based on the total weight of the thermal inkjet ink.

An example of a suitable anti-decel agent is LIPONIC® EG-1 (LEG-1, glycereth-26, available from Lipo Chemicals).

The vehicle of the thermal inkjet ink may also include surfactant(s). In any of the examples disclosed herein, the surfactant may be present in an amount ranging from about 0.1 wt % to about 3 wt % (based on the total weight of the thermal inkjet ink). In an example, the surfactant is present in the thermal inkjet ink in an amount of about 0.3 wt %, based on the total weight of the thermal inkjet ink.

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include biocide(s). In an example, the total amount of biocide(s) in the thermal inkjet ink ranges from about 0.1 wt % to about 0.25 wt % (based on the total weight of the thermal inkjet ink). In another example, the total amount of biocide(s) in the thermal inkjet ink is about 0.22 wt % (based on the total weight of the thermal inkjet ink). In some instances, the biocide may be present in the pigment dispersion that is mixed with the vehicle.

Examples of suitable biocides include the NUOSEPT® (Ashland Inc.), UCARCIDE™ or KORDEK™ (Dow Chemical Co.), PROXEL® (Arch Chemicals) series, ACTICIDE® B20 and ACTICIDE® M20 (Thor Chemicals), and combinations thereof.

The vehicle may also include a pH adjuster. A pH adjuster may be included in the thermal inkjet ink to achieve a desired pH (e.g., a pH of about 8.5) and/or to counteract any slight pH drop that may occur over time. In an example, the total amount of pH adjuster(s) in the thermal inkjet ink ranges from greater than 0 wt % to about 0.1 wt % (based on the total weight of the thermal inkjet ink). In another example, the total amount of pH adjuster(s) in the inkjet ink composition is about 0.03 wt % (based on the total weight of the thermal inkjet ink).

Examples of suitable pH adjusters include metal hydroxide bases, such as potassium hydroxide (KOH), sodium hydroxide (NaOH), etc. In an example, the metal hydroxide base may be added to the thermal inkjet ink in an aqueous solution. In another example, the metal hydroxide base may be added to the thermal inkjet ink in an aqueous solution including 5 wt % of the metal hydroxide base (e.g., a 5 wt % potassium hydroxide aqueous solution).

The balance of the thermal inkjet ink is water. In an example, deionized water may be used. The water included in the thermal inkjet ink may be: i) part of the pigment dispersion, ii) part of the vehicle, iii) added to a mixture of the pigment dispersion and the vehicle, or iv) a combination thereof.

Second Example Inkjet Ink

In another example, the inkjet ink is a thermal inkjet ink including a pigment, a sulfonated polyester-polyurethane binder, a vehicle, and a balance of water. In some examples, the thermal inkjet ink consists of the pigment, the sulfonated polyester-polyurethane binder, the vehicle, and a balance of water, with no other components.

One example of this inkjet ink can include from about 60 wt % to about 90 wt % water, from about 5 wt % to about 30 wt % organic co-solvent, from about 1 wt % to about 6 wt % pigment, and from about 2 wt % to about 15 wt % of sulfonated polyester-polyurethane binder having an average particle size from 20 nm to 500 nm.

In this second example inkjet ink, any of the pigments described herein in reference to the first example inkjet ink may be used. In this other example, the pigment may be self-dispersed, or may be dispersed by a dispersant, such as a styrene (meth)acrylate dispersant, or another dispersant (e.g., a maleic polymer or a dispersant with aromatic groups and a poly(ethylene oxide) chain) suitable for keeping the pigment suspended in the liquid vehicle.

In this other example ink, the binder resin is a sulfonated polyester-polyurethane binder. In various examples, the sulfonated polyester-polyurethane binder can have a weight average molecular weight from about 20,000 Mw to about 300,000 Mw, can have an acid number from 1 to 50, and/or can have an average particle size from about 20 nm to about 500 nm. More specifically, the weight average molecular weight can be from about 50,000 Mw to about 500,000 Mw, from about 100,000 Mw to about 400,000 Mw, or from about 150,000 Mw to about 300,000 Mw; the acid number can be from 1 mg KOH/g to 200 mg KOH/g, from 2 mg KOH/g to 100 mg KOH/g, or from 3 mg KOH/g to 50 mg KOH/g; and the average particle size can range from about 20 nm to about 500 nm, from about 50 nm to about 350 nm, or from about 100 nm to about 250 nm. The particle size of any solids disclosed herein, including the average particle size of the dispersed polymer binder, can be determined using a Nanotrac® Wave device, from Microtrac, e.g., Nanotrac® Wave II or Nanotrac® 150, etc, which measures particles size using dynamic light scattering.

The sulfonated polyester-polyurethane binder can be aliphatic, including multiple saturated carbon chain portions ranging from $C_4$ to $C_8$ in length and be devoid of aromatic moieties. In another example, the sulfonated polyester-polyurethane binder can be aromatic, including both aromatic moieties as well as saturated carbon chain portions ranging from $C_4$ to $C_8$ in length. In some examples, the sulfonated polyester-polyurethane binder can include diaminesulfonate groups. Even with the sulfonate groups, these binders are generally not very soluble in the water and organic co-solvent liquid vehicle, and thus can be considered to be a dispersed polymer.

In one example, the sulfonated polyester-polyurethane binder can be anionic. In further detail, the sulfonated polyester-polyurethane binder can also be aliphatic including saturated carbon chains therein as part of the polymer backbone or side-chain thereof, e.g., C2 to C10, C3 to C8, or C3 to C6 alkyl. These polyester-polyurethane binders can be described as "alkyl" or "aliphatic" because these carbon chains are saturated and because they are devoid of aromatic moieties. An example anionic aliphatic polyester-polyurethane binder that can be used is Impranil® DLN-SD (CAS #375390-41-3; Mw 133,000 Mw; Acid Number 5.2; Tg—47° C.; Melting Point 175-200° C.) from Covestro (Germany). Example components used to prepare the Impranil® DLN-SD or other similar anionic aliphatic polyester-polyurethane binders can include pentyl glycols, e.g., neopentyl glycol; C4-C8 alkyldiol, e.g., hexane-1,6-diol; C3 to C5 alkyl dicarboxylic acids, e.g., adipic acid; C4 to C8 alkyl diisocyanates, e.g., hexamethylene diisocyanate (HDI); diamine sulfonic acids, e.g., 1-[(2-aminoethyl)amino]-ethanesulfonic acid; etc. Alternatively, the polyester-polyurethane binder can be aromatic (or include an aromatic moiety) along with aliphatic chains. An example of an aromatic polyester-polyurethane binder that can be used is Dispercoll® U42 (CAS #157352-07-3). Example components used to prepare the Dispercoll® U42 or other similar aromatic polyester-polyurethane binders can include aromatic dicarboxylic acids, e.g., phthalic acid; C4 to C8 alkyl dialcohols, e.g., hexane-1,6-diol; C4 to C8 alkyl diisocyanates, e.g., hexamethylene diisocyanate (HDI); diamine sulfonic acids, e.g., 1-[(2-aminoethyl)amino]-ethanesulfonic acid; etc. Other types of polyester-polyurethanes can also be used, including Impranil® DL 1380, which can be somewhat more difficult to jet from thermal inkjet printheads compared to Impranil® DLN-SD and Dispercoll® U42, but still can be acceptably jetted in some examples, and can also provide acceptable washfastness results on a variety of fabric types.

In an example, the sulfonated polyester-polyurethane binder is present in the inkjet ink in an amount ranging from about 2 wt % to about 15 wt % of the total weight of the inkjet ink.

The organic co-solvent in the second example inkjet ink may be any of the previously listed polar solvents, such as aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1, 3-propane diol (EPHD), glycerol, dimethyl sulfoxide, sulfolane, glycol ethers, alkyldiols such as 1,2-hexanediol, and/or ethoxylated glycerols such as LEG-1, etc. In this example ink, the co-solvent(s) may be present in an amount ranging from about 4 wt % to about 30 wt % (based on the total weight of the second example inkjet ink).

In this example ink, the surfactant may be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. The surfactant(s) can be included in this example ink composition at from about 0.01 wt % to about 5 wt % and, in some examples, can be present at from about 0.05 wt % to about 3 wt % of the ink compositions.

Other liquid vehicle components can also be included, such as biocides, pH adjusted, anti-kogation agents, etc. in the amounts set forth herein for the other examples of the inkjet ink.

Suitable pH ranges for this example of the ink composition can be from pH 7 to pH 11, from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

Third example inkjet ink

Still another example of the inkjet ink may be used in combination with a crosslinker composition. In this example, the ink composition can include from 60 wt % to 90 wt % water, from 5 wt % to 30 wt % organic co-solvent, from 1 wt % to 6 wt % pigment, and a latex polymer including an aromatic (meth)acrylate moiety; and the crosslinker composition can include from 70 wt % to 95 wt % water, from 1 wt % to 25 wt % organic co-solvent, and from 1 wt % to 10 wt % polycarbodiimide. In some examples, the inkjet ink consists of the water, the organic co-solvent, the pigment, and the latex polymer including an aromatic (meth) acrylate moiety, with no other components. The third example inkjet ink may have a pH ranging from pH 7 to pH 10, and the crosslinker composition may have a basic pH ranging from pH 8 to pH 10.

In this example ink, any of the pigments described herein in reference to the first example inkjet ink may be used. In this example, the pigment may be dispersed by a dispersant, such as a styrene (meth)acrylate dispersant adsorbed at a surface of the pigment.

This example ink also includes a latex polymer. The term "latex polymer" in this third example inkjet ink generally refers to any dispersed polymer prepared from acrylate and/or methacrylate monomers, including an aromatic (meth)acrylate monomer that results in aromatic (meth) acrylate moieties as part of the latex. In an example, the latex polymer may be devoid of styrene. In some examples, the latex particles can include a single heteropolymer that is homogenously copolymerized. In another example, a multi-phase latex polymer can be prepared that includes a first heteropolymer and a second heteropolymer. The two heteropolymers can be physically separated in the latex particles, such as in a core-shell configuration, a two-hemisphere configuration, smaller spheres of one phase distributed in a larger sphere of the other phase, interlocking strands of the two phases, and so on. If a two-phase polymer, the first heteropolymer phase can be polymerized from two or more aliphatic (meth)acrylate ester monomers or two or more aliphatic (meth)acrylamide monomers. The second heteropolymer phase can be polymerized from a cycloaliphatic monomer, such as a cycloaliphatic (meth)acrylate monomer or a cycloaliphatic (meth)acrylamide monomer. The first or second heteropolymer phase can include the aromatic (meth)acrylate monomer, e.g., phenyl, benzyl, naphthyl, etc. In one example, the aromatic (meth)acrylate monomer can be a phenoxylalkyl (meth)acrylate that forms a phenoxylalkyl (meth)acrylate moiety within the latex polymer, e.g. phenoxyether, phenoxylpropyl, etc. The second heteropolymer phase can have a higher $T_g$ than the first heteropolymer phase in one example. The first heteropolymer composition may be considered a soft polymer composition and the second heteropolymers composition may be considered a hard polymer composition. If a two-phase heteropolymer, the first heteropolymer composition can be present in the latex polymer in an amount ranging from about 15 wt % to about 70 wt % of a total weight of the polymer particle, and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle, and the second heteropolymer composition can be present in an amount ranging from about 60 wt % to about 70 wt % of the total weight of the polymer particle.

In more general terms, whether there is a single heteropolymer phase, or there are multiple heteropolymer phases, heteropolymer(s) or copolymer(s) can include a number of various types of copolymerized monomers, including aliphatic(meth)acrylate ester monomers, such as linear or branched aliphatic (meth)acrylate monomers, cycloaliphatic (meth)acrylate ester monomers, or aromatic monomers. However, in accordance with the present disclosure, the aromatic monomer(s) selected for use can include an aromatic (meth)acrylate monomer. To be clear, reference to an "aromatic (meth)acrylate" does not include the copolymerization of two different monomers copolymerized together into a common polymer, e.g., styrene and methyl methacrylate. Rather, the term "aromatic (meth)acrylate" refers to a single aromatic monomer that is functionalized by an acrylate, methacrylate, acrylic acid, or methacrylic acid, etc.

The weight average molecular weight of the latex polymer can be from 50,000 Mw to 500,000 Mw, for example. The acid number of the latex polymer can be from 2 mg KOH/g to 40 mg KOH/g, from 2 mg KOH/g to 30 mg KOH/g, or 3 mg KOH/g to 26 mg KOH/g, or 4 mg KOH/g to 20 mg KOH/g, for example. The latex polymer can be present in this example ink at a relatively high concentration, e.g., from 5 wt % to 20 wt %, from 6 wt % to 15 wt %, or from 7 wt % to 12 wt %, for example.

The latex polymer can be in acid form, such as in the form of a polymer with (meth)acrylic acid surface groups, or may be in its salt form, such as in the form of a polymer with poly(meth)acrylate groups.

The organic co-solvent in the third example inkjet ink may be any of the previously listed polar solvents, in an amount ranging from about 4 wt % to about 30 wt % (based on the total weight of the inkjet ink).

In this example ink, the surfactant may be water soluble and may include any of the examples in any of the amounts set forth for the second example inkjet ink.

Other liquid vehicle components can also be included, such as biocides, pH adjusted, anti-kogation agents, etc. in the amounts set forth herein for the other examples of the inkjet ink.

This third example inkjet ink is used with a crosslinker composition, which includes a polycarbodiimide dispersed in a liquid vehicle. The liquid vehicle in the third example ink composition and the liquid vehicle in the crosslinker composition are not typically the same liquid vehicle formulation, but can have common ingredients, such as water, for example. Both can also include an organic co-solvent (that may or may not be the same selected co-solvent(s)). Thus, the discussion of the liquid vehicle described herein related to the third ink composition is also relevant to the liquid vehicle of the crosslinker composition, and the same types of liquid vehicle components can be independently selected for use in the crosslinker composition.

The polycarbodiimide can be any of a number of polycarbodiimides with two or more carbodiimide groups. Thus, when the crosslinker composition is printed on the textile fabric 33, the (meth)acrylic acid group(s) (such as provided by the aromatic (meth)acrylate moieties or other (meth) acrylates that may be present at a surface of the polymer latex in the third ink composition), the polycarbodiimide in the crosslinker composition, and in some instances, the surface of the fabric media substrate can interact to generate a high quality image that exhibits durable washfastness as demonstrated in the examples hereinafter. The polycarbodiimide can be present in the crosslinker composition at from 1 wt % to 7 wt %, from 2 wt % to 7 wt %, from 2 wt % to 6 wt %, from 3 wt % to 7 wt %, or from 3 wt % to 6 wt %, for example. In some example, the polycarbodiimide can have a weight average molecular weight of 1,500 Mw to 150,000 Mw, from 2,000 Mw to 100,000 Mw, or from 5,000 Mw to 75,000 Mw.

Fourth Example Inkjet Ink

A fourth example inkjet ink includes a pigmented ink composition with a blocked polyisocyanate crosslinker contained therein. Alternatively, a pigmented ink and a separate jettable fluid containing the blocked polyisocyanate crosslinker may be used together. The fourth example ink composition (with or without the crosslinker) and the separate crosslinker composition, where applicable, can include a predominant amount of water, organic co-solvent, etc. The fourth ink composition also includes a dispersed polymer binder, such as a latex or polyurethane polymer.

In this example ink, any of the pigments described herein in reference to the first example inkjet ink may be used. In this example, the pigment may be dispersed by a dispersant, such as an acrylic dispersant, styrene-acrylic dispersant, styrene-maleic dispersant, or a dispersant with aromatic groups and a poly(ethylene oxide) chain, such as Esperse 100 from Evonik (Germany) and Solesperse 2700 from Lubrizol (USA), adsorbed to a surface thereof.

The term "blocked polyisocyanate" refers to compounds with multiple isocyanate groups where a plurality of the isocyanate groups are coupled to a chemical moiety that stabilize the isocyanate groups in the ink composition or crosslinker composition so that they remain available for reaction after printing on the textile fabric 33. The chemical moiety that prevents the isocyanate groups from reacting can be referred to herein as a "blocking group." To convert the blocked polyisocyanate to a reactive species, the blocking group can be dissociated from isocyanate groups to result in a "deblocked polyisocyanate." Deblocking can occur in by heating the blocked polyisocyanate to a temperature where deblocking or dissociation can occur, e.g., typically at from 100° C. to 200° C. There are deblocking or dissociation temperatures outside of this range, e.g., at lower temperatures, but in accordance with examples of the present disclosure, higher temperature deblocking in some examples can have the added benefit of softening or melting the latex polymer that is to be crosslinked with the deblocked polyisocyanate.

In one example, the blocked polyisocyanate crosslinker can include a blocked polyisocyanate trimer. The blocked polyisocyanate trimer can have the structure shown in Formula I, as follows:

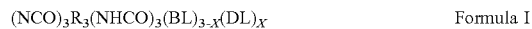

$$(NCO)_3R_3(NHCO)_3(BL)_{3-X}(DL)_X \qquad \text{Formula I}$$

where R can independently include a C2 to C10 branched or straight-chained alkyl, C6 to C20 alicyclic, C6 to C20 aromatic, or a combination thereof; BL can include a blocking group such as a phenol blocking group, a lactam blocking group, an oxime blocking group, a pyrazole blocking group, or a combination thereof; x can be from greater than 0 to 1; and DL can include a hydrophilic dispersing group. In one example, R can be from C4 to C8 alkyl and BL can be a dimethyl pyrazole. Two specific examples of blocked polyisocyanates that can be used include Imprafix® 2794 from Covestro (Germany) and Matsui Fixer WF-N from Matsui Shikiso Chemical (Japan).

When present in the fourth example ink composition, the blocked polyisocyanate can be present at from 0.02 wt % to 2 wt %, and when present in a separate crosslinker composition, the concentration can be from 0.5 wt % to 10 wt %, for example.

The fourth example ink also includes the dispersed polymer binder. In an example, the dispersed polymer binder can have an average particle size from 20 nm to 500 nm, and can be an acrylic latex polymer, a styrene acrylic latex polymer, a polyurethane polymer (e.g., a polyester-polyurethane polymer), or a mixture thereof. The dispersed polymer binder can be prepared or selected so that it can be crosslinked upon deblocking of the blocked polyisocyanate, for example.

The fourth example ink composition can include (or consist of) from 60 wt % to 90 wt % water, from 5 wt % to 30 wt % organic co-solvent, from 1 wt % to 6 wt % pigment, from 2 wt % to 24 wt % dispersed polymer binder, and from 0.02 wt % to 2 wt % blocked polyisocyanate crosslinker. The weight ratio of the blocked polyisocyanate crosslinker to dispersed polymer binder can be from 1:100 to 1:12.

The organic co-solvent in the fourth example inkjet ink may be any of the previously listed polar solvents, in an amount ranging from about 4 wt % to about 30 wt % (based on the total weight of the inkjet ink).

Other liquid vehicle components can also be included, such as surfactant(s), biocides, pH adjusted, anti-kogation agents, etc. in the amounts set forth herein for the other examples of the inkjet ink.

When the fourth example ink does not the blocked polyisocyanate, the separate crosslinker composition is used with the ink (which may include (or consist of), for example, from 60 wt % to 90 wt % water, from 5 wt % to 30 wt % organic co-solvent, from 1 wt % to 6 wt % pigment, and from 2 wt % to 10 wt % dispersed polymer binder). The separate crosslinker composition includes the blocked polyisocyanate and a liquid vehicle (which can include water and organic co-solvent, for example), and can include similar components or different components relative to the liquid vehicle of the fourth example ink composition. In an example, the crosslinker composition can include from 70 wt % to 94.5 water, from 5 wt % to 25 wt % organic co-solvent, and from 0.5 wt % to 10 wt % blocked polyisocyanate crosslinker.

Jetting Methods

In some examples, the printed image may be generated by thermal inkjet printing multiple thermal inkjet inks on e.g., a cotton fabric. When multiple thermal inkjet inks are used, each of the multiple thermal inkjet inks may be an example of the thermal inkjet ink described herein. In an example, multiple thermal inkjet inks may be used to create a multi-colored print. In these examples, the multiple thermal inkjet inks may each include a different pigment, which may introduce a different color to each thermal inkjet ink. The portions of print on which the thermal inkjet ink(s) are thermal inkjet printed display the color(s) of the corresponding thermal inkjet ink(s), or a color generated by mixing of two or more of the thermal inkjet inks.

In an example, the thermal inkjet printing of the thermal inkjet ink is accomplished using a thermal inkjet printer. In the thermal inkjet printer, a media handling system feeds the textile fabric through a print/image zone. In some examples, a series of advance or drive rollers (not shown) powered by a motor and gear assembly may be used to move the textile fabric from a supply tray into the print/image zone for printing. The printer may have a scan axis, and a carriage may be supported for reciprocal movement along the scan axis back and forth across the print/image zone. The carriage may support inkjet applicator(s) (i.e., cartridges, pens, etc.) that dispense the thermal inkjet ink(s) disclosed herein onto the cotton fabric. The carriage is driven by a propulsion system that operates in response to control signals received from a processor.

The printer may also include a platen upon which the textile substrate/fabric 33 is transported for warming and/or radiation exposure. In some examples, the platen may be thermally conductive (e.g., copper), and thus may be heated in order to warm the textile fabric 33 to a temperature below a fixation temperature of the inkjet ink 24. In other examples, the platen may be minimally- or non-thermally conductive (e.g., stainless steel, glass, etc.) In these other examples, when warming is desirable, the source 36 may be used for warming; and/or source 28 or another heat source (e.g., heating pads adjacent to the platen) may be used for warming.

It is to be understood that the pigmented inkjet inks may also be suitable for, or formulated to be suitable for jetting via piezoelectric inkjet printheads. When intended for piezoelectric printing, the amount of the water soluble or water miscible co-solvent may be greater than or equal to 50 wt %, based on the total weight of the inkjet ink. Also, the amount of water included in the inkjet ink may vary, depending upon the amounts of the other inkjet ink components. As an example, thermal inkjet compositions may include more water than piezoelectric inkjet compositions.

Further, the total solids content of the inkjet ink composition may be variable depending on the intended use of the inkjet ink. In an example, the inkjet ink composition is a thermal inkjet ink, and has a solids content ranging from about 2 wt % to about 8 wt % based on the total weight of the thermal inkjet ink. In another example, the inkjet ink composition is a piezoelectric inkjet ink, and has a solids content ranging from about 10 wt % to about 25 wt % based on the total weight of the piezoelectric inkjet ink. The solids content impacts the viscosity. Where the ink composition is intended for use with thermal inkjet printheads, the viscosity of the ink as measured at ambient conditions (e.g., 25° C., 1 atm) may be less than or equal to 6 centipoise (cP). However, where the ink composition is intended for use with piezoelectric printheads, the viscosity of the ink as measured at ambient conditions may be greater than or equal to 10 cP.

To further illustrate the present disclosure, examples are given herein. It is to be understood these examples are provided for illustrative purposes and are not to be construed as limiting the scope of the present disclosure.

EXAMPLES

Two sample pigmented inkjet inks (black and yellow) were used. The formulations for these sample inks are shown in Table 1.

In Table 1, the weight percentages given for the pigment dispersion and the biocides represent wt % actives in the ink formulations.

TABLE 1

| Ingredient | Specific Component | Amount (wt %) |
| --- | --- | --- |
| Pigment dispersion | Black pigment dispersion or Yellow pigment dispersion | 2 |
| Co-solvent | Glycerol | 8 |
| Anti-decel agent | LEG-1 | 1 |
| Anti-kogation agent | CRODAFOS ™ N-3A | 0.5 |
| Surfactant | SURFYNOL ® 440 | 0.3 |
| Biocide | ACTICIDE ® B20 | 0.22 |
| Water | | Balance |

The type of the pigment dispersion, the type of binder, and amount of binder in each example thermal inkjet ink is shown in Table 2. The weight percentage of the binder dispersion represents the total binder solids present in the final thermal inkjet ink formulations.

TABLE 2

| Ink | Pigment dispersion | Binder dispersion | Amount of binder dispersion (wt %) |
| --- | --- | --- | --- |
| Example yellow inkjet ink | Yellow pigment dispersion | JONCRYL ® 683 | 2 |
| Example black inkjet ink | Black pigment dispersion | JONCRYL ® 683 | 2 |

A cesium tungsten oxide (CTO) active agent was used. The formulation for the CTO active agent is shown in Table 3, with the wt % of each component that was used.

TABLE 3

| Component | Weight % |
| --- | --- |
| 1-(2-hydroxyethyl)-2-pyrrolidone | 25 |
| TERGITOL ® 15S30 | 0.2 |
| Betaine | 10 |
| Cesium tungsten oxide | 8 |
| Water | balance |

Example 1

A solid color (i.e., not a mixture of two or more colors) yellow pigmented inkjet ink (from Table 1) was digitally printed using an HP 831 thermal inkjet color printhead onto an Aberdeen 6243-60 fabric (100% polyester). From another print cartridge in the HP 831 thermal inkjet color printhead, the CTO active agent (from Table 3) was printed on top of the yellow ink at varying levels (from 0% to 100%) of concentration/loading (with respect to a total volume of the yellow ink printed). An A4025 (12 ng) thermal inkjet pen was used to print the inkjet ink at a 3 drop per pixel (dpp) ink flux, and an A4049 (9 ng) thermal inkjet pen was used to print the active agent at a 3 drop per pixel (dpp) ink flux. The printing conditions were 70% ink, 4 passes, no print zone heat, and no curing.

There were no jet-ability issues and no ink compatibility issues.

After printing, the textile fabric swatches were exposed to IR radiation. The condition set is shown in Table 4 below.

TABLE 4

| Parameter | Value |
|---|---|
| Pre-heat rate | 50° C./minute |
| Ramp up temperature | 130° C. |
| Warming time | 3 seconds |
| Lamp intensity | 100% |
| IR Flash duration | 2 seconds |
| Temperature range | 150° C.-180° C. |

Figure 3:
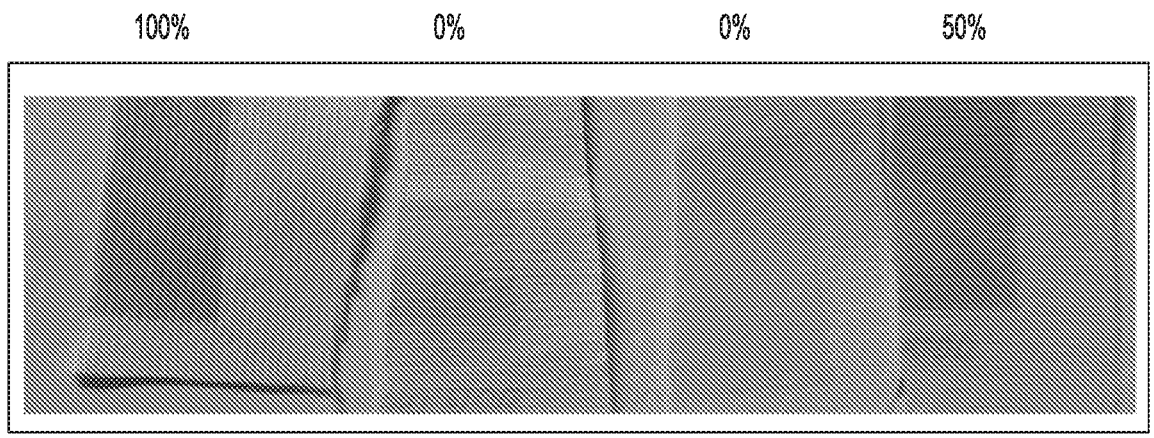
FIG. 3 is a black and white reproduction of an originally colored photograph of textile swatches printed with a yellow pigment inkjet ink and varying amounts of an active agent and then exposed to infrared radiation.
Figure 4:
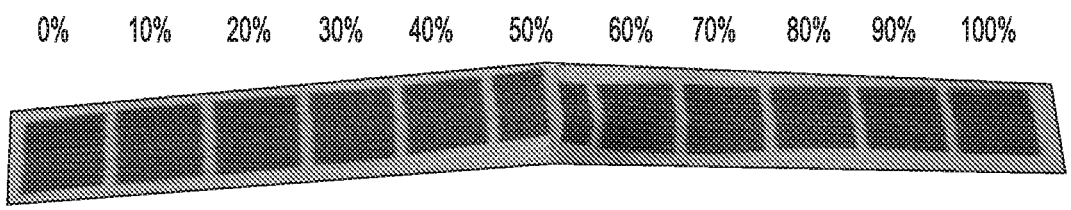
FIG. 4 is a black and white reproduction of an originally colored photograph of textile swatches printed with a black pigment inkjet ink and varying amounts of an active agent and then exposed to infrared radiation.
Figure 5A:
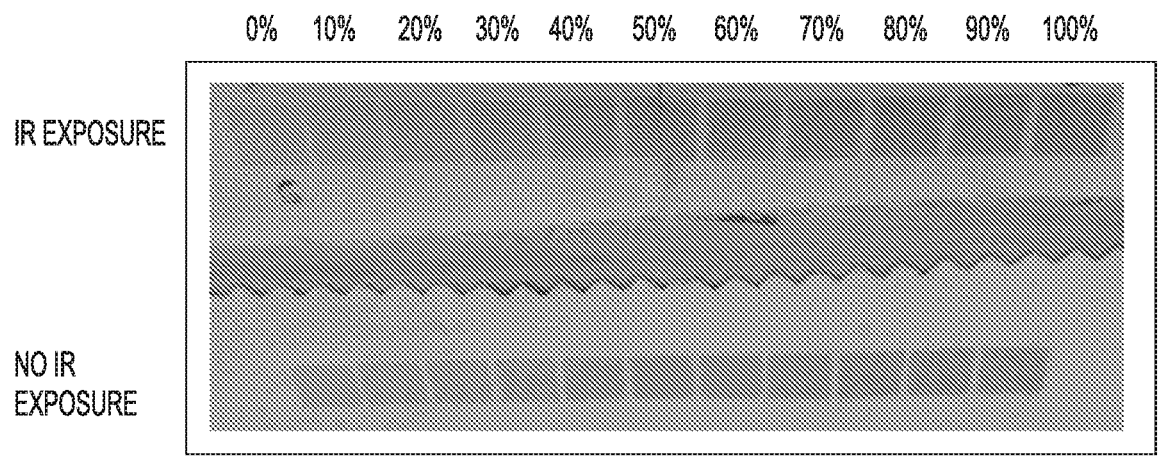
FIG. 5A is a black and white reproduction of an originally colored photograph of textile swatches printed with a yellow pigment inkjet ink and varying amounts of an active agent and then exposed to infrared radiation (top row of swatches), or then not exposed to infrared radiation (control—bottom row of swatches)

The swatches after IR exposure are shown in FIG. 3, FIG. 4 and FIG. 5A. FIG. 3 shows textile swatches printed with a yellow pigment inkjet ink and 100%, 0%, 0% and 50% (left to right) of the active agent and then exposed to infrared radiation. At 50% of the active agent, the color of the inkjet ink may be affected, and at 100% of the active agent, the color of the inkjet ink may be more significantly affected (e.g., a bluish halo may result). FIG. 4 shows textile swatches printed with a black pigment inkjet ink and varying amounts (0% to 100%, left to right) of the active agent and then exposed to infrared radiation. FIG. 5A shows textile swatches printed with a yellow pigment inkjet ink and varying amounts (0% to 100%, left to right) of the active agent and then exposed to infrared radiation (top row of swatches), or then not exposed to infrared radiation (control—bottom row of swatches).

The fabric swatches were inspected visually, and the results of the visual observations after the IR exposure are shown in Table 5 below.

TABLE 5

| Color | Active Agent loading (%)/ exposed to IR (Yes/No) | Fixation (Yes/No) |
|---|---|---|
| Black | 0%/Yes | No |
| Yellow | 0%/No | No |
| Yellow | 0%/Yes | No |
| Black | 10%/Yes | Yes |
| Yellow | 10%/No | No |
| Yellow | 10%/Yes | Yes |
| Black | 20%/Yes | Yes |
| Yellow | 20%/No | No |
| Yellow | 20%/Yes | Yes |
| Black | 30%/Yes | Yes |
| Yellow | 30%/No | No |
| Yellow | 30%/Yes | Yes |
| Black | 40%/Yes | Yes |
| Yellow | 40%/No | No |
| Yellow | 40%/Yes | Yes |
| Black | 50%/Yes | Yes |
| Yellow | 50%/No | No |
| Yellow | 50%/Yes | Yes |
| Black | 60%/Yes | Yes |
| Yellow | 60%/No | No |
| Yellow | 60%/Yes | Yes |
| Black | 70%/Yes | Yes |
| Yellow | 70%/No | No |
| Yellow | 70%/Yes | Yes |
| Black | 80%/Yes | Yes |
| Yellow | 80%/No | No |
| Yellow | 80%/Yes | Yes |
| Black | 90%/Yes | Yes |
| Yellow | 90%/No | No |
| Yellow | 90%/Yes | Yes |
| Black | 100%/Yes | Yes |
| Yellow | 100%/No | No |
| Yellow | 100%/Yes | Yes |

Depending on the amount of active agent, the sample fabric swatches performed differently. The control (no exposure to IR radiation) did not fix the pigment; while all other samples (except for swatches having 0% CTO active agent) showed that fixation occurs. When the active agent was printed in higher amounts (about 60% or more) with the black pigment inkjet ink, there was slight deformation of the fabric swatches.

Example 2

The yellow example printed swatches and the control printed swatches (with no IR exposure) from FIG. 5A were tested for washfastness.

American Association of Textile Chemists and Colorists (AATCC) Test method 61 was used. This test method is an accelerated laundering test that is used to evaluate the colorfastness to laundering of textiles which are expected to withstand frequent laundering. The test uses an accelerated laundering machine that rotates the swatches in closed canisters in a thermostatically controlled water bath. The swatches are tested under appropriate conditions of temperature, detergent solution, bleaching and abrasive action, such that the color change is similar to that occurring in five hand or home launderings (e.g., washing the samples 5 times by hand or in a washer with warm water (at about 40° C.) and detergent).

The L*a*b* values of a color (e.g., cyan, magenta, yellow, black, red, green, blue, white) after the accelerated laundering test were measured. L* is lightness, a* is the color channel for color opponents green-red, and b* is the color channel for color opponents blue-yellow.

The color change was then calculated using the CIEDE2000 color-difference formula. The CIEDE2000 color-difference formula is based on the CIELAB color space. Given a pair of color values in CIELAB space $L^*_1, a^*_1, b^*_1$ and $L^*_2, a^*_2, b^*_2$, the CIEDE2000 color difference between them is as follows:

$$\Delta E_{00}(L^*_1, a^*_1, b^*_1; L^*_2, a^*_2, b^*_2) = \Delta E_{00}^{12} = \Delta E_{00} \qquad (1)$$

It is noted that $\Delta E_{00}$ is the commonly accepted notation for CIEDE2000.

Given two CIELAB color values $\{L^*_i, a^*_i, b^*_i\}_{i=1}^{2}$ and parametric weighting factors $k_L$, $k_C$, $k_H$, the process of computation of the color difference is summarized in the following equations, grouped as three main parts.

1. Calculate $C'_i, h'_i$:

$$C^*_{i,ab} = \sqrt{((a^*_i)^2 + (b^*_i)^2)}, \; i = 1, 2 \qquad (2)$$

$$\overline{C}^*_{ab} = \frac{C^*_{1,ab} + C^*_{2,ab}}{2} \qquad (3)$$

$$G = 0.5\left(1 - \sqrt{\frac{\overline{C}^{*7}_{ab}}{\overline{C}^{*7}_{ab} + 25^7}}\right) \qquad (4)$$

$$a'_i = (1 + G)a^*_i, \; i = 1, 2 \qquad (5)$$

$$C'_i = \sqrt{((a'_i)^2 + (b'_i)^2)}, \; i = 1, 2 \qquad (6)$$

$$h'_i = \begin{cases} 0 & b^*_i = a'_i = 0 \\ \tan^{-1}(b^*_i, a'_i) & \text{otherwise} \end{cases}, \; i = 1, 2 \qquad (7)$$

2. Calculate ΔL', ΔC', ΔH':

$$\Delta L' = L_2^* - L_1^* \quad (8)$$

$$\Delta C' = C_2^* - C_1^* \quad (9)$$

$$\Delta h' = \begin{cases} 0 & C_1' C_2' = 0 \\ h_2' - h_1' & C_1' C_2' \neq 0; |h_2' - h_1'| \leq 180° \\ (h_2' - h_1') - 360 & C_1' C_2' \neq 0; (h_2' - h_1') > 180° \\ (h_2' - h_1') + 360 & C_1' C_2' \neq 0; (h_2' - h_1') < -180° \end{cases} \quad (10)$$

$$\Delta H' = 2\sqrt{C_1' C_2'} \sin\left(\frac{\Delta h'}{2}\right) \quad (11)$$

3. Calculate CIEDE2000 color-difference $\Delta E_{00}$:

$$\overline{L}' = (L_1^* + L_2^*)/2 \quad (12)$$

$$\overline{C}' = (C_1' + C_2')/2 \quad (13)$$

$$\overline{h}' = \begin{cases} \dfrac{h_1' + h_2'}{2} & |h_1' - h_2'| \leq 180°; C_1' C_2' \neq 0 \\ \dfrac{h_1' + h_2' + 360°}{2} & |h_1' - h_2'| > 180°; (h_1' + h_2') < 360°; \\ & C_1' C_2' \neq 0 \\ \dfrac{h_1' + h_2' - 360°}{2} & |h_1' - h_2'| > 180°; (h_1' + h_2') \geq 360°; \\ & C_1' C_2' \neq 0 \\ (h_2' + h_1') & C_1' C_2' \neq 0 \end{cases} \quad (14)$$

$$T = 1 - 0.17\cos(\overline{h}' - 30°) + 0.24\cos(2\overline{h}') + \quad (15)$$
$$0.32\cos(3\overline{h}' + 6°) - 0.20\cos(4\overline{h}' - 63°)$$

$$\Delta\theta = 30\exp\left\{-\left[\frac{\overline{h}' - 275°}{25}\right]^2\right\} \quad (16)$$

$$R_C = 2\sqrt{\left(\frac{\overline{C}'^7}{\overline{C}'^7 + 25^7}\right)} \quad (17)$$

$$S_L = 1 + \frac{0.015(\overline{L}' - 50)^2}{\sqrt{(20 + (\overline{L}' - 50)^2)}} \quad (18)$$

$$S_C = 1 + 0.045\overline{C}' \quad (19)$$

$$S_H = 1 + 0.015\overline{C}'T \quad (20)$$

$$R_T = -\sin(2\Delta\theta)R_C \quad (21)$$

$$\Delta E_{00}^{12} = \Delta E_{00}(L_1^*, a_1^*, b_1^*; L_2^*, a_2^*, b_2^*) = \quad (22)$$
$$\sqrt{\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T\left(\frac{\Delta C'}{k_C S_C}\right)\left(\frac{\Delta H'}{k_H S_H}\right)}$$

Figure 5B:
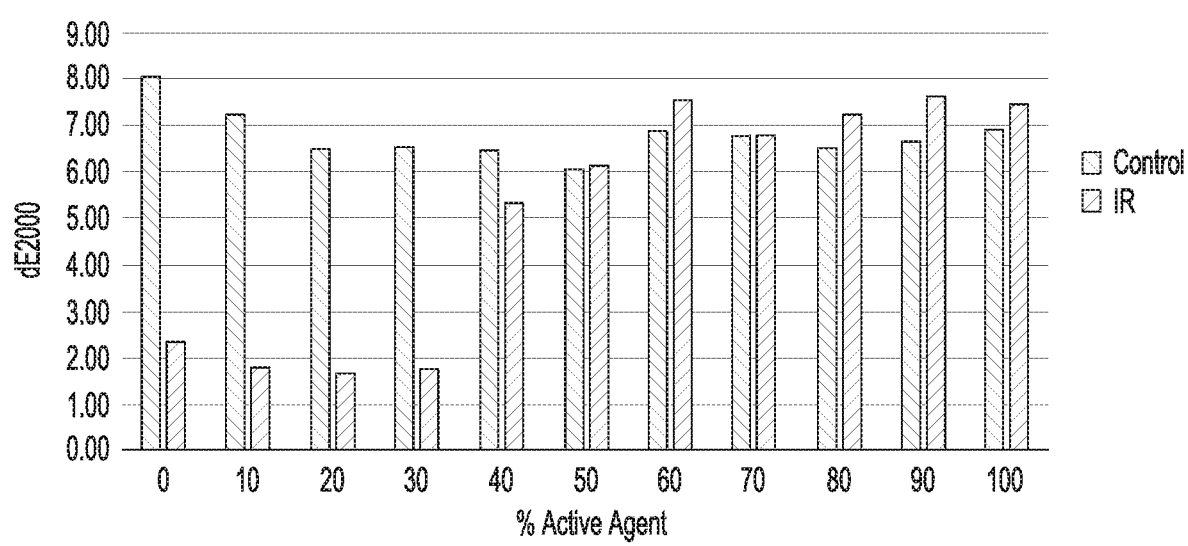
FIG. 5B is a bar graph showing results of a washfastness test of the swatches of FIG. 5A.

The $\Delta E_{00}$ calculations are shown below in Table 6 and in FIG. 5B. In FIG. 5B, the designation "Control" refers to the control printed swatches with no IR exposure, and the designation "IR" refers to the yellow example printed swatches that had been exposed to infrared (IR) radiation.

TABLE 6

| Active Agent loading (%)/ exposed to IR (Yes/No) | $\Delta E_{00}$ |
|---|---|
| 0%/No | 8.0 |
| 0%/Yes | 2.3 |
| 10%/No | 7.2 |
| 10%/Yes | 1.8 |
| 20%/No | 6.5 |
| 20%/Yes | 1.6 |
| 30%/No | 6.6 |
| 30%/Yes | 1.7 |
| 40%/No | 6.5 |
| 40%/Yes | 5.3 |
| 50%/No | 6.0 |
| 50%/Yes | 6.1 |
| 60%/No | 6.9 |
| 60%/Yes | 7.5 |
| 70%/No | 6.8 |
| 70%/Yes | 6.8 |
| 80%/No | 6.5 |
| 80%/Yes | 7.2 |
| 90%/No | 6.6 |
| 90%/Yes | 7.7 |
| 100%/No | 6.9 |
| 100%/Yes | 7.4 |

As shown in Table 6 and FIG. 5B, the $\Delta E_{00}$ (designated dE2000 on the Y-axis in FIG. 5B) is less than 2 for each of the printed swatches generated with 10%, 20% or 30% active agent and exposed to IR. This shows that with the active agent equal to or less than 30% and IR exposure, washfastness performance improves (e.g., bringing $\Delta E_{00}$ from about 6.5/7 to about 1.5 (the lower the $\Delta E_{00}$ is, the better). As such, these results indicate that these printed swatches have good washfastness.

These experiments confirmed that pigmented inkjet ink colors are fixed onto the fabric if the active agent (as low as 10% with respect to a total volume of the respective ink printed) is present and then exposed to sufficient IR radiation. As such, there was no need for post-processing.

Since application of the active agent may affect the color properties of a printed textile, in an example, the active agent volume applied is kept low (e.g., from about 10% to about 20%, relative to a total volume of the inkjet ink printed onto the textile fabric) to preserve desirable color quality. Further, it is more efficient in terms of ink usage to use less of the active agent.

It is to be understood that the ranges provided herein include the stated range and any value or sub-range within the stated range, as if the value(s) or sub-range(s) within the stated range were explicitly recited. For example, from about 10% to about 30% should be interpreted to include not only the explicitly recited limits of from about 10% to about 30%, but also to include individual values, such as about 12%, about 15%, about 27.2%, etc., and sub-ranges, such as from about 11% to about 25%, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A printing method, comprising:
   selecting an inkjet ink including a pigment;
   selecting an active agent, including:
   an electromagnetic radiation-absorbing active material; and
   an aqueous or non-aqueous vehicle;
   maintaining the inkjet ink separate from the active agent until they are inkjet printed onto a textile fabric;
   inkjet printing the active agent directly onto the textile fabric;
   warming the textile fabric having the active agent thereon at a temperature below a fixation temperature of the inkjet ink;
   then inkjet printing the inkjet ink onto the textile fabric; and
   exposing the textile fabric having the ink and active agent thereon to electromagnetic radiation.

2. The printing method as defined in claim 1, further comprising warming the textile fabric having the ink and the active agent thereon at a temperature below a fixation temperature of the inkjet ink: i) before the exposing; or ii) concurrently with the exposing; or iii) both before and concurrently with the exposing.

3. The printing method as defined in claim 2 wherein the temperature at which the textile fabric having the ink and the active agent thereon is warmed ranges from about 60° C. to about 100° C.

4. The printing method as defined in claim 2 wherein the warming of the textile fabric having the ink and the active agent thereon takes place for an amount of time ranging from about 0.1 seconds to about 30 seconds.

5. The printing method as defined in claim 1 wherein the exposing takes place for an amount of time sufficient to raise a temperature of the textile fabric having the inkjet ink and the active agent thereon to between about 60° C. and about 200° C.

6. The printing method as defined in claim 1 wherein the exposing is accomplished at an amount of time ranging from about 1 second to about 15 seconds.

7. The printing method as defined in claim 1 wherein the electromagnetic radiation to which the textile fabric is exposed has a wavelength ranging from about 700 nm to about 1 mm.

8. The printing method as defined in claim 1 wherein the electromagnetic radiation-absorbing active material is selected from the group consisting of an infrared light absorber, a near-infrared light absorber, a plasmonic resonance absorber, and combinations thereof.

9. The printing method as defined in claim 8 wherein the electromagnetic radiation-absorbing active material comprises the plasmonic resonance absorber.

10. The printing method as defined in claim 9 wherein the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

11. The printing method as defined in claim 1 wherein an amount of the active agent printed onto the textile fabric ranges from about 1% to about 50%, relative to a total volume of the inkjet ink printed onto the textile fabric.

12. The printing method as defined in claim 1 wherein the textile fabric is selected from the group consisting of organic textile fabrics, inorganic textile fabrics, and combinations thereof.

13. The printing method as defined in claim 1 wherein an amount of the active agent printed onto the textile fabric ranges from about 12% to about 30%, relative to a total volume of the inkjet ink printed onto the textile fabric.

14. The printing method as defined in claim 1 wherein the textile fabric is an untreated natural fabric textile substrate.

15. The printing method as defined in claim 1, wherein the exposing provides localized heating from the active agent and accomplishes fixation of the inkjet ink onto the textile fabric to form a printed image.

16. The printing method as defined in claim 9 wherein the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, platinum, iron pyroxenes, modified iron phosphates, modified copper phosphates, modified copper pyrophosphates, and combinations thereof.

* * * * *